United States Patent Office 3,385,714
Patented May 28, 1968

3,385,714
STERILIZED MILKSHAKE AND THE PROCESS
FOR MAKING SAME
Watson B. Smith, North Syracuse, N.Y., assignor to The Borden Company, New York, N.Y., a corporation of New Jersey
No Drawing. Filed Feb. 1, 1965, Ser. No. 429,640
3 Claims. (Cl. 99—171)

ABSTRACT OF THE DISCLOSURE

This invention relates to sterile packaged liquid milkshake mixes which can be refrigerated, agitated and dispensed from the package to provide a milkshake comprising a sealed container filled to at least about 50% of its total volume with a liquid milkshake mix, said mix containing a viscosity control agent comprising a combination of a colloid selected from the group consisting of colloidal seaweed extracts and vegetable gums, and a colloidal gum, said agent being present in an amount sufficient to give said mix an initial viscosity after sterilization of about 40 to about 90 seconds at 80° F.

---

As conventionally used, the term "milkshake" applies to a dairy product made by admixing milk, ice cream, and a syrup in varying proportions and aereating the mixture. More recently attempts have been made to prepare pasteurized or sterilized milkshake products which can be placed into containers, either of glass or metal, and dispensed therefrom after refrigeration and agitation. An example is the product disclosed in the McLaughlin Patent No. 3,084,052 relating to an aseptic milkshake product. Such products, however, do not have the required viscosity essential to give the product a texture similar to the soda fountain milkshakes. They are either too thin, watery, or their viscosity is so high as to result in a grainy, lumpy product. Both extremes are unsuitable and result in commercially unsatisfactory products.

The present invention comprises a packaged liquid milkshake mix for refrigerated storage which can be agitated and opened just prior to use to provide a milkshake, containing a viscosity control agent comprising a combination of a colloid selected from the group consisting of colloidal seaweed extracts and vegetable gums, and a cellulose gum; preferably a combination of carrageenin and sodium carboxymethylcellulose. The invention also relates to the method of making such product.

As to the liquid milkshake mix the ingredients and proportions thereof are those ordinarily used to make the conventional ice cream milkshake with the exception of the viscosity control agent as set forth later herein. The ingredients are whole milk, condensed whole milk, heavy cream or butter, condensed skim milk, non-fat dry milk, sugar, corn sugar, flavor components depending upon the type of flavored milkshake to be made, such as chocolate, coffee, strawberry and vanilla, and an emulsifier such as glycerol monosterate. Artifical colors (certified food colors) can also be added as well as vitamins A, $B_1$, $B_2$, C and D.

As to proportions, the butter fat in the product may vary from 4% to 10%, preferably about 5%, the sugar content from 6% to 14%, the non-fat milk solids from 6% to 14%, and the product preferably has total solids content of about 25%. It is evident that a wide range of solids and ingredients content is possible, the cited proportions being optimum.

The critical component of the milkshake is the viscosity control agent. Examples of such colloidal seaweed extracts are carrageenin (also known as Irish Moss, carrageen, and other names), sodium alginate, and propylene glycol alginate. Suitable vegetable gums are locust bean gum, gum guar and gum tragacanth. Of these the carrageenin is preferred. Of the cellulose gums, sodium carboxymethylcellulose is preferred although methyl cellulose and methyl ethyl celluose can be used.

The viscosity control agent must be used to produce the proper viscosity effect in the product not only upon packaging, but further upon agitation and incorporation of the gas as described later herein. It has been found that only the use of this viscosity control agent will give the required viscosity upon sterilization and will give a suitable product upon dispensing. The use of either component of the agent alone or combinations of other materials have proven unsatisfactory. Others either give a thin bodied product lacking the texture and thick viscosity required of a milkshake when agitated or cause the product to become so thick in the can as to be unable to incorporate air therein when agitated.

The proportion of viscosity control agent in the milkshake mix will vary dependent upon the solids content tion process, is opened and brought to 80° F. The viscosity control agent must be added in an amount sufficient to give an initial viscosity of about 40 to about 90 seconds at 80° F. after sterilization. The viscosity is readily measured to assure the proper viscosity by the following test:

A can of sterilized product, taken directly from sterilization process, is opened and brought to 80° F. The viscosity is then measured using a viscosimeter cup (similar to a Ford Oil Cup) with a $\frac{7}{64}$" orifice and a 100 ml. volumetric flask (Kohlrausch Flask). The cup containing a plug in the orifice is filled to capacity with product. The plug is removed and the product discharges through the orifice into the volumetric flask. The time in seconds required to fill the flask to the 100 ml. mark is the viscosity of the product.

For a product with 25% solids about 0.06% to about 0.07% of the viscosity control agent is required to obtain the necessary viscosity. Increasing or decreasing the total solids content necessitates corresponding adjustments in the amount of viscosity control added. This figure is easily ascertained by making test runs when the solids content is to be varied. Also the heat stability characteristic of the protein in the milk products may require adjustment of the level of viscosity control agent.

A second variable which controls the amount of viscosity control agent used is the flavoring of the milkshake mix. When a chocolate milkshake product is to be made and a flavoring agent, such as cocoa, is added, the amount of viscosity control agent used is about one-half to one-third that ordinarily used. Thus, for a 25% total solids chocolate milkshake formulation about 0.03% to about 0.035% viscosity control agent is added.

As to proportions of colloid and cellulose gum in the viscosity control agent, these vary from about 2 to about 5 parts by weight of the cellulose gum to each part by weight of the colloid; preferably 3 parts of cellulose gum for each part of extract. Here again, chocolate flavoring alters the proportions so that they should be reversed, i.e., 2 to 5 parts by weight of colloid to each part by weight of cellulose gum.

The method of the preparation of the product is also important. The incorporation of the viscosity control agent requires that the two components of the viscosity control agent be first slurried with water at a temperature above about 150° F. preferably at about 190° F., before being added to the remainder of the constituents of the mix which have been preheated. Once the heated slurry of the viscosity control agent has been prepared, it is added to the mixture of the milk, sugar, heavy cream (40%), non-fat dry milk, glycerol monosterate and other components of the mix which have previously been mixed together and heated to a temperature above about 100° F., preferably about 160° F. After addition of the viscosity control agent, the product is then homogenized, cooled, and filled into sanitary cans and sterilized by the high temperature short time method conventional for the treatment of dairy products, such as evaporated milk and the like. If desired, the product may also be canned by use of the aseptic canning method referred to in the McLaughlin Patent No. 3,084,052.

In the instant invention the container is filled with liquid mix to a level between approximately 50% to 90% of its total volume. It is preferred to fill between 80% to 90%. The remaining volume in the container, or head space is filled with gas, preferably air. The canned product is then cooled and stored prior to use. In order to be dispensed as a milkshake after refrigeration the can is agitated in order to thoroughly admix the gas with the liquid mix. The result is an aerated product with a viscosity of about 100 seconds or more at 50° F. giving the milkshake upon dispensing from the container the texture and mouth feel of a conventional milkshake.

The invention is further illustrated in the following examples.

EXAMPLE 1

A chocolate flavored liquid milkshake mix was prepared having the following composition and a total solids content of 25.5%:

| | Percent by weight |
|---|---|
| Butter fat | 5.5 |
| Milk-solids-not-fat | 9.3 |
| Sugar | 9.6 |
| Cocoa | 1.0 |
| Emulsifier (glycerol monostearate) | 0.07 |
| Viscosity control agent: | |
| (a) Carageenan | 0.02 |
| (b) Sodium carboxymethylcellulose | 0.01 |
| Water | 74.50 |
| | 100.00 |

The mix was prepared by heating all the ingredients, except the carrageenin and cellulose, to 160° F. The carrageenin and sodium carboxymethylcellulose were slurried in water at 190° F. and added to the other heated ingredients. After thoroughly admixing all the ingredients to disperse the viscosity control agent throughout the mix, the mix was homogenized at 2500 p.s.i.g., cooled to 50° F. and placed into sanitary cans to a level of 90% of the total volume of each can. The headspace was filled with air and the cans sealed.

The canned mix was then sterilized by the conventional continuous high-temperature short-time method; 265° F. for 120 seconds and cooled to 80° F. The viscosity of the product was then tested by the method set forth above and found to be about 65 seconds.

After refrigeration the cans were thoroughly agitated and the chocolate milkshake dispensed from the can had the texture and mouth feel of a conventional soda fountain milkshake.

EXAMPLE 2

A vanilla flavored liquid milkshake mix was prepared having the following composition and a total soilds content of 25.4%:

| | Percent by weight |
|---|---|
| Butter fat | 5.5 |
| Milk-solids-not-fat | 9.2 |
| Sugar | 10.5 |
| Flavoring (vanillin) | 0.07 |
| Emulsifier (glycerol monostearate) | 0.07 |
| Viscosity control agent: | |
| (a) Carrageenin | 0.02 |
| (b) Sodium carboxylmethylcellulose | 0.04 |
| Water | 74.6 |
| | 100.00 |

The mix was prepared by the method set forth in Example 1. The resultant product after 9 months had, after refrigeration and agitation, a viscosity at 50° F. of 100 seconds and the texture and mouth feel were equivalent to a conventional soda fountain milkshake.

EXAMPLE 3

The formulation and process of Example 1 is followed except that equivalent amounts of sodium alginate, and gum guar, propylene glycol alginate, gum tragacanth, and locust bean gum are substituted for the carrageenin and used therein and equivalent amounts of methyl cellulose and methyl ethyl cellulose substituted for the sodium carboxymethylcellulose. Equally good results are obtained.

While the examples are all directed to the use of milk and milk-solids-not-fat; vegetable fats and oils non-dairy proteins and sugars can be substituted therefor to get equally good results.

It will be understood that it is intended to cover all changes and modifications of the examples of the invention herein chosen for the purpose of illustration which do not constitute departures from the spirit and scope of the invention.

I claim:

1. The process of making a sterilized packaged liquid milkshake mix which comprises forming a slurry of a colloid selected from the group consisting of colloidal seaweed extracts and vegetable gums, and a cellulose gum with water at a temperature above about 150° F., incorporating said slurry into the other components of the mix while they are at a temperature above about 100° F., and homogenizing and sterilizing the mixture, the proportion of colloid and vegetable gum being 2 to 5 parts by weight of cellulose gum for each part by weight of colloid, except that for chocolate flavor milkshake mix the proportion is 2 to 5 parts by weight of the colloid for each part by weight of the cellulose gum, to give the product an initial viscosity, after sterilization, of about 40 to about 90 seconds at 80° F.

2. The process of making a sterilized packaged liquid milkshake mix which comprises forming a slurry of carrageenin and sodium carboxymethylcellulose in water at about 19° F., adding the slurry to the remaining ingredients of the mix while they are at a temperature of about 160° F., and homogenizing and sterilizing the mixture, the proportion of carrageenin and sodium carboxymethylcellulose being 2 to 5 parts of sodium carboxymethylcellulose for each part by weight of carrageenin, except that for chocolate flavor milkshake mix the proportion is 2 to 5 parts by weight of carrageenin for each part by weight of the sodium carboxymethylcellulose, to give the product an initial viscosity, after sterilization, of about 40 to about 90 seconds at 80° F.

3. The product of the process of claim 1.

References Cited

UNITED STATES PATENTS

| 2,604,406 | 7/1952 | Blihovde | 99—25 X |
| 3,084,052 | 4/1963 | McLaughlin | 99—189 |

HYMAN LORD, *Primary Examiner.*

A. LOUIS MONACELL, *Examiner.*

S. E. HEYMAN, *Assistant Examiner.*

UNITED STATES PATENT OFFICE
CERTIFICATE OF CORRECTION

Patent No. 3,385,714  May 28, 1968

Watson B. Smith

It is certified that error appears in the above identified patent and that said Letters Patent are hereby corrected as shown below:

Column 1, line 30, "of" should read -- or --; same column 1, line 60, and Column 3, line 2, "monosterate", each occurrence, should read -- monostearate --. Column 2, line 23, "tion process, is opened and brought to 80° F. The viscosity" should read -- of the mix and the flavor material used. The viscosity --. Column 4, line 51, "19° F." should read -- 190° F. --.

Signed and sealed this 14th day of October 1969.

(SEAL)
Attest:

Edward M. Fletcher, Jr.
Attesting Officer

WILLIAM E. SCHUYLER, JR.
Commissioner of Patents